United States Patent [19]

Zahka et al.

[11] 4,017,282

[45] Apr. 12, 1977

[54] RAIN RETARDANT SCREEN

[76] Inventors: Joseph G. Zahka, 16A Deerwood Drive, Amherst, N.H. 03031; Ruthven H. Daniels, Old Amherst Road, Mount Vernon, N.H. 03057

[22] Filed: May 22, 1975

[21] Appl. No.: 579,909

Related U.S. Application Data

[63] Continuation-in-part of Ser. No. 371,297, June 18, 1973, abandoned.

[52] U.S. Cl. .................................. 55/428; 55/486; 55/524; 55/525; 98/37; 160/DIG. 7
[51] Int. Cl.² ........................................ B01D 39/10
[58] Field of Search .......... 55/278, 280, 522, 524, 55/485, 525, DIG. 25, 486, 489, 484, 428; 98/37, 885; 160/114, 179, DIG. 7; 427/247; 428/256, 422

[56] References Cited

UNITED STATES PATENTS

| | | | |
|---|---|---|---|
| 1,458,984 | 6/1923 | Kunkel | 160/44 |
| 2,441,819 | 5/1948 | Jensen | 160/DIG. 7 |
| 2,453,192 | 11/1948 | Bryant | 55/524 X |
| 2,466,948 | 4/1949 | Hemphill | 160/44 |
| 2,541,838 | 2/1951 | Shardlow | 55/524 X |
| 3,165,470 | 1/1965 | Giesse et al. | 55/524 X |
| 3,394,533 | 7/1968 | Yishengli et al. | 55/524 X |
| 3,507,708 | 4/1970 | Vingnaud | 55/524 X |
| 3,563,474 | 2/1971 | Robinson | 55/486 X |
| 3,631,654 | 1/1972 | Riely et al. | 55/524 X |
| 3,912,474 | 10/1975 | Drews | 55/524 |

*Primary Examiner*—Frank W. Lutter
*Assistant Examiner*—David L. Lacey
*Attorney, Agent, or Firm*—Schuyler, Birch, Swindler, McKie & Beckett

[57] ABSTRACT

A device is presented which prevents rain drops from penetrating and which allows light and gas to be transmitted in a rain-free environment. The device is a screen assembly whose outer surface (toward outdoors) has a contact angle with water of greater than 90° and whose inner surface has a contact angle with water of less than 90°.

18 Claims, 5 Drawing Figures

RAIN RETARDANT SCREEN

This application is a continuation-in-part of application Ser. No. 371,297, filed June 18, 1973, now abandoned.

FIELD OF THE INVENTION

This invention relates generally to devices used as ventilators, particularly ventilators which allow air and light to enter an enclosure but prevent rain drops from entering.

BACKGROUND OF THE INVENTION

In general devices which are used to both ventilate an enclosure and prevent rain from entering, are baffled or louvered devices. These baffles provide a tortuous path for the air or gas to travel, causing the heavier-than-air rain drops to precipitate. The greater the tortuosity, the more efficient the device becomes in preventing rain from entering. However, increasing the tortuosity of the path increases the resistance to air flow, reducing the efficiency of the baffle or louvre as a ventilator. The tortuous path also reduces the light which may pass through the baffle, as well as making incoherent the light rays from an image.

OBJECTS OF THE INVENTION

It is an object of this invention to provide a ventilator which will prevent rain drops from passing through to the atmosphere of an enclosure.

It is also an object of this invention to provide a ventilator which allows light to be transmitted.

It is an object of this invention to provide a ventilator which allows air to pass freely during operation in a rain-free environment.

DESCRIPTION OF THE DRAWINGS

The invention will be more fully understood from the following description taken in conjunction with the accompanying drawings in which.

DETAILED DESCRIPTION OF THE INVENTION

In its most basic form the rainproof ventilator is a screen assembly whose surface properties are such as to prevent water from entering the atmosphere on the inside of the ventilator. The screen, which will be further discussed, may have naturally advantageous surface properties or may be treated to provide these properties.

The term "screen" is meant to describe any porous medium with straight through pores. The screen material may be any material capable of being formed into such a porous configuration. Suitable screen materials include metals such as stainless steel or aluminum and cloth such as nylon. The screen may be formed from these materials by conventional techniques such as bonding filamentary materials at their intersections or by weaving the materials into an open mesh sheet.

The size and number of the pore openings of the screen mesh or membrane affects the properties of the ventilator. Large pore size accompanied by a large percent open area result in excellent ventilation and light transmission characteristics; however, the resulting structure would have low rain retardant capabilities. If the pores were extremely fine, accompanied by a small percent open area, the ventilator would have excellent rain retardant capabilities but have poor ventilation and light transmission characteristics. In order to provide a device which acts as a ventilator, allows coherent light to be transmitted, and retards the passage of rain, the screen must have a fine pore diameter and moderate percent open area. Although exact value ranges will depend on the embodiment of the invention, the perimeter of the pore should be less than 0.160 inch and the percent open area of each screen or membrane in the assembly should be between 5 and 70 percent.

Figure 1:
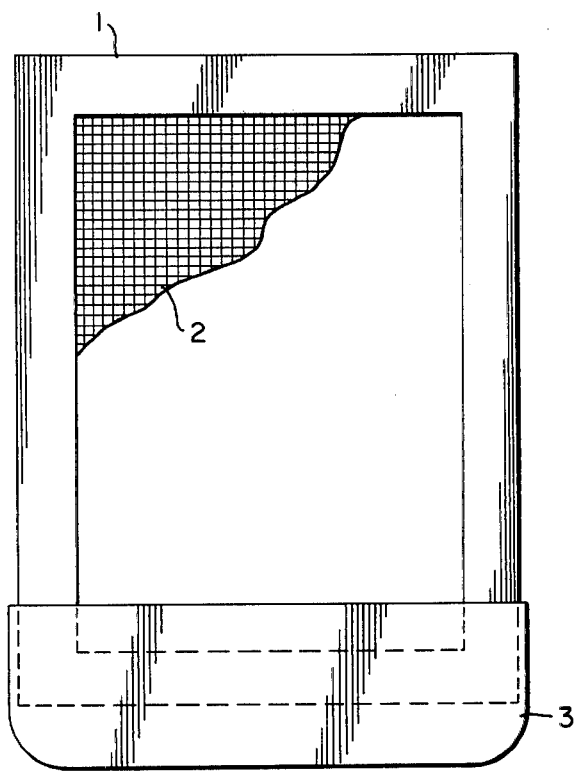
FIG. 1 is a partial cutaway front view of one embodiment of the invention.

FIG. 1 is a front view of the simplest embodiment of the invention. It consists of a frame 1, single layer of treated screen 2, and drain assembly 3.

Figure 2:
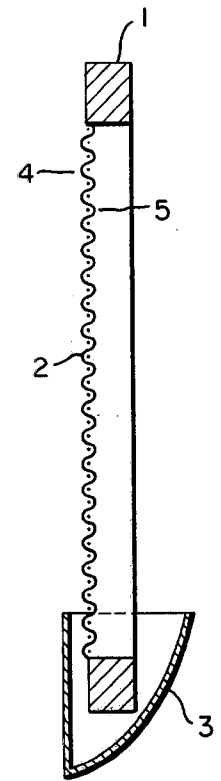
FIG. 2 is a sectional side view of the embodiment of the invention shown in FIG. 1.

FIG. 2 is a sectional side view of the same embodiment of the invention. The inside 5 and outside 4 surfaces of the invention are labeled in FIG. 2.

For best results the outer surface of the screen 4 should have a contact angle with water of greater than 90°. The inner surface of the screen 5 should have a contact angle with water of less than 90°.

The term "contact angle" refers to the angle formed by a liquid on the surface of a solid at the gas-solid-liquid interface, measured as the dihedral angle in the liquid. Its value depends on the relative surface energies of the three interfaces, vapor-solid, vapor-liquid and solid-liquid. The equation relating the surface free energies in equilibrium is as follows:

$$\gamma_{LV} \cos\theta = \gamma_{SV} - \gamma_{SL}$$

where $\gamma$ is the surface free energy; $LV$ is the liquid-vapor interface; $SV$ is the solid-vapor interface; $SL$ is the solid-liquid interface; and $\theta$ is the contact angle. Depending on the nature of the solid, liquid and vapor, the liquid will form a specific contact angle with the surface. Since in the case of the rain screen the liquid and vapor are defined, the solid surface can be modified to affect the contact angle. In this system, a solid surface with a contact angle greater than 90° will be hydrophobic, and a surface with a contact angle of less than 90° will exhibit hydrophillic properties.

Referring to the embodiment shown in FIGS. 1 and 2, the outer surface of the screen 4 is treated so that it has a contact angle of greater than 90°, and the inner surface 5 has a contact angle of less than 90°.

Water striking the outer surface of the screen tends to be shed due to the surface properties of the material. More specifically, porous materials which are hydrophobic exhibit a phenomenon called capillary depression. For instance, the hydrophobic screening described can hold back a six-inch head of water.

The particular equation describing the phenomena is:
$$P = (2\gamma\cos\theta/r)$$
where
P = the pressure difference across the meniscus in the capillary
$\gamma$ = surface tension of the liquid (in this case water)

θ = contact angle of liquid with pore surface
r = effective radius of capillary (in this case effective radius of the screen pore)

In the case of the hydrophobic screen θ is greater than 90° so cosθ is negative. This indicates that there is pressure keeping water droplets from entering the pore.

This capillary depression pressure will keep water from entering and passing through the pores up to a certain dynamic pressure. If there is a driving rain or extremely fine mist, water will be extruded through the pores.

Under some conditions, then, there are fine water droplets coming through the hydrophobic screen. The inner screen surface with a contact angle of less than 90° acts on these droplets to coalesce them into larger droplets so that they precipitate to the gutter. The screen coalesces the droplets because the water preferentially wets the screen surface.

The screen surfaces of the present invention may be prepared by any method which results in the desired surface properties. By way of example, the outer screen surface may be made hydrophobic (contact angle greater than 90°) by coating the surface with a layer of hydrophobic material. One suitable hydrophobic coating material is TEFLON (a Registered trademark of the DuPont de Nemours Company) which is poly tetrafluoroethylene. Other suitable hydrophobic coating materials include silicone polymers and materials such as ZELAN (a Registered trademark of the DuPont de Nemours Company) which is a water repellant textile finish. The hydrophobic coating material may be applied to the outer screen surface in any suitable manner, such as for example, spraying.

The inner screen surface, as described above, should be hydrophillic. Many screen materials possess hydrophillic surface properties in their natural uncoated state. Certain metals such as stainless steel and aluminum and certain cloth materials such as nylon are examples of such naturally hydrophillic materials. If the inner screen surface consists of a material in this class, no further treatment of the screen is required. If, on the other hand, the screen material does not possess the requisite surface properties, it may be treated by applying a coating of hydrophillic material. The hydrophillicity of naturally hydrophillic materials may also be increased by coating them with such a material. Any of the well known hydrophillic coating materials may be employed to impart the requisite surface properties to the inner screen surface. As discussed above, the coatings may be applied by spraying or other suitable techniques.

Figure 3:
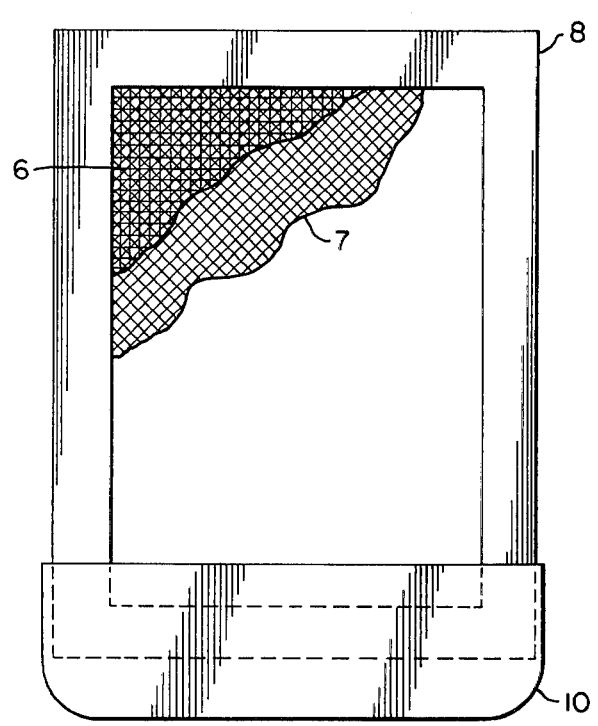
FIG. 3 is a partial cutaway front view of another embodiment of the invention.
Figure 4:
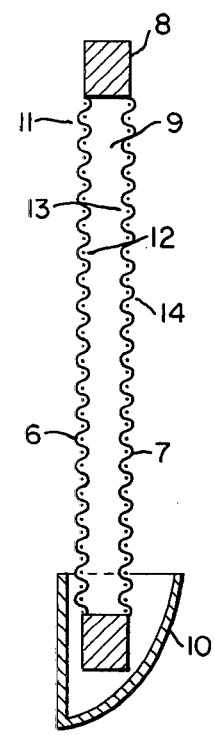
FIG. 4 is a sectional side view of the embodiment of the invention shown in FIG. 3.

FIG. 3 and 4 are a partial cutaway front view and sectional side view respectively of another embodiment of the invention. In this version of the invention an outer mesh 6 and inner mesh 7 supported by a frame 8 are separated by an air space 9. A drain assembly 10 is also present. The air space should be wider than 0.05 inch. Under most conditions, the wider the air space, the more rain retardant the ventilator becomes. Very good rain retardance is achieved when the space is about 3/16 to ⅜ of an inch.

Several combinations of surface characteristics on the four screen surfaces 11, 12, 13, 14 were tested for rain retardance. In Table 1 the different combinations are ranked according to rain retardant characteristics.

TABLE I

| | Contact angle with water (degrees) | | | | |
|---|---|---|---|---|---|
| | Outer Screen 6 | | Inner Screen 7 | | |
| Case | Outer Surface 11 | Inner Surface 12 | Outer Surface 13 | Inner Surface 14 | Rank |
| 1 | more than 90 | less than 90 | less than 90 | less than 90 | 1 |
| 2 | more than 90 | more than 90 | less than 90 | less than 90 | 2 |
| 3 | more than 90 | less than 90 | more than 90 | less than 90 | 3 |
| 4 | less than 90 | less than 90 | less than 90 | less than 90 | 4 |

In general the best rain retardant conditions occur when the contact angle with water on the outer surface of the outer screen is greater than 90° and the contact angle with water on the inner surface of the inner screen is less than 90°.

The following is a description of the operation of the embodiment of the invention presented in "Case 1." As the rain strikes the outer surface of the ventilator, a majority of the water will run off the outer surface of the outer screen 11 because of its hydrophobic properties as discussed above. Some water may extrude through the pores, however. A majority of this water will be attracted to the inside surface of the outer screen 12, coalesce and run down the surface and out the drain 10 in the same manner as in the previously discussed embodiment. The remainder of the water which extruded through the pores of the outer screen strikes the inner screen 7. The water is attracted to the screen since it is also hydrophillic, and the water fills the pores forming a barrier to the passage of rain drops. The excess water runs down the surfaces of the inner screen to the drain 10. Once the rain stops striking the ventilator, the water in the pores of the screen will evaporate, again allowing gas to permeate freely.

The following is an example of the preferred construction of a screen assembly which possesses the characteristics of "Case 1." The outer screen consisted of a 60 mesh stainless steel woven screen. The outer surface of this outer screen was spraycoated with TEFLON. The inner surface of the outer screen was left uncoated. The inner screen was a 100 mesh stainless steel woven screen. Both surfaces of the inner screen were left uncoated. The two screen sections were formed in an assembly by affixing them to a 3/16 inch thick wooden frame.

Figure 5:
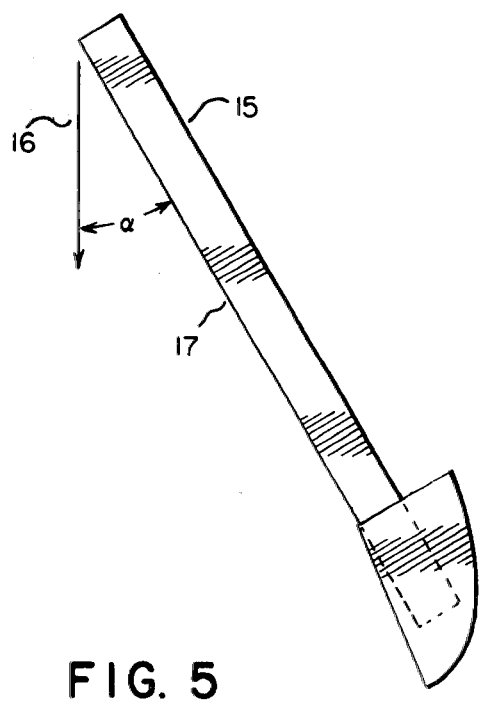
FIG. 5 is a sketch to indicate how the invention may be employed with respect to the gravitational field.

FIG. 5 shows the placement of the invention 15 relative to gravitational force 16. Increasing the angle αλ from 0° toward 90° improves the rain retardance of the invention. The outer surface of the invention 17 is also indicated in FIG. 5

The rain retardant screen also acts as a snow retardant screen since the snowflakes are generally larger than the pore openings and tend not to adhere to the outer surface of the invention.

While reference has been made throughout the foregoing specification to "rain drops," it will of course be recognized that the invention is applicable to repelling water drops from any source that could gravitate toward the screen surface. Aqueous solutions generally may also be repelled. A typical non-rain application of the screen of the present invention is in a heat exchange or cooling tower where air flow is needed for convection cooling and light is needed to retard the growth of microorganisms. The screen of the present invention could accomplish this while containing the water spray.

We claim:

1. A water retardant screen which retards the passage of water drops therethrough from an outer surface exposed to a water-containing atmosphere to an inner surface thereof and allows the passage of light rays and air therethrough comprising:
    a screen mesh having fine pore diameter and moderate percent open area, said mesh having said inner and said outer surface;
    said outer surface having a contact angle with water greater than 90°; and
    said inner surface having a contact angle with water less than 90°.

2. The water retardant screen of claim 1 wherein said screen mesh has pores which have a perimeter of less than 0.160 inch.

3. The water retardant screen of claim 1 further comprising gutter means for channeling water, which flows down the inner surface of said screen mesh, away from said screen.

4. The apparatus of claim 1 wherein said outer surface has a coating of a hydrophobic material thereon.

5. The apparatus of claim 1 wherein said inner surface has a coating of a hydrophillic material thereon.

6. A water retardant screen assembly, which retards the passage of water drops therethrough from an outer surface to an inner surface thereof and allows the passage of light rays and air therethrough, comprising:
    inner and outer layers of screen mesh having fine pore diameter and moderate percent open area, each of said layers having said inner and said outer surfaces; and
    means for maintaining said inner and outer layers in a spaced parallel relationship;
    said outer surface of the outer layer of screen mesh having a contact angle with water which is greater than 90°; and
    at least two of the remaining three surfaces of said inner and outer layers having a contact angle with water which is less than 90°.

7. The assembly of claim 6 wherein said inner and outer layers of screen mesh have pores which have a perimeter of less than 0.160 inch.

8. The screen assembly of claim 7 further comprising a gutter means to channel water, which flows down the surfaces having a contact angle less than 90° of said layers of screen mesh.

9. The assembly of claim 8 wherein the inner surface of said outer layer and the inner and outer surface of said inner layer all have a contact angle with water of less than 90°.

10. The assembly of claim 8 wherein the inner surface of said outer layer has a contact angle with water of greater than 90° and both the inner and outer surfaces of said inner layer have a contact angle with water of less than 90°.

11. The assembly of claim 8 wherein the inner surface of said outer layer and the inner surface of said inner layer both have a contact angle with water of less than 90° and the outer surface of said inner layer has a contact angle with water of greater than 90°.

12. The assembly of claim 6 wherein said outer surface of said outer layer has a coating of a hydrophobic material thereon.

13. The assembly of claim 12 wherein the inner surface of said outer layer and the inner and outer surface of said inner layer all exhibit hydrophillic surface properties.

14. The assembly of claim 12 wherein the inner surface of said outer layer exhibits hydrophobic surface properties and both the inner and outer surfaces of said inner layer exhibit hydrophillic surface properties.

15. The assembly of claim 12 wherein the inner surface of said outer layer and the inner surface of said inner layer both exhibit hydrophillic surface properties and the outer surface of said inner layer exhibits hydrophobic surface properties.

16. A water retardant screen assembly, which retards the passage of water drops therethrough from an outer surface to an inner surface thereof and allows the passage of light rays and air therethrough, comprising:
    inner and outer layers of stainless steel screen mesh having fine pore diameter and moderate percent open area, each of said layers having said inner and said outer surfaces;
    means for maintaining said inner and outer layers in a spaced parallel relationship; and gutter means connected to said assembly for channeling water away from said assembly;
    said outer surface of the outer layer of screen mesh having a coating of hydrophobic material thereon.

17. The assembly of claim 16 wherein said inner and outer layers of screen mesh have pore sores which have a perimeter of less than 0.160 inch.

18. The assembly of claim 17 wherein said layers are spaced at from about 3/16 inches to about 3/8 inches apart.

* * * * *